3,164,482
REFRACTORY LINING
Albert Lajos Renkey, Pittsburgh, Pa., assignor to Harbison Walker Refractories Company, Pittsburgh, Pa., a corporation of Pennsylvania
Filed Sept. 18, 1962, Ser. No. 224,488
10 Claims. (Cl. 106—44)

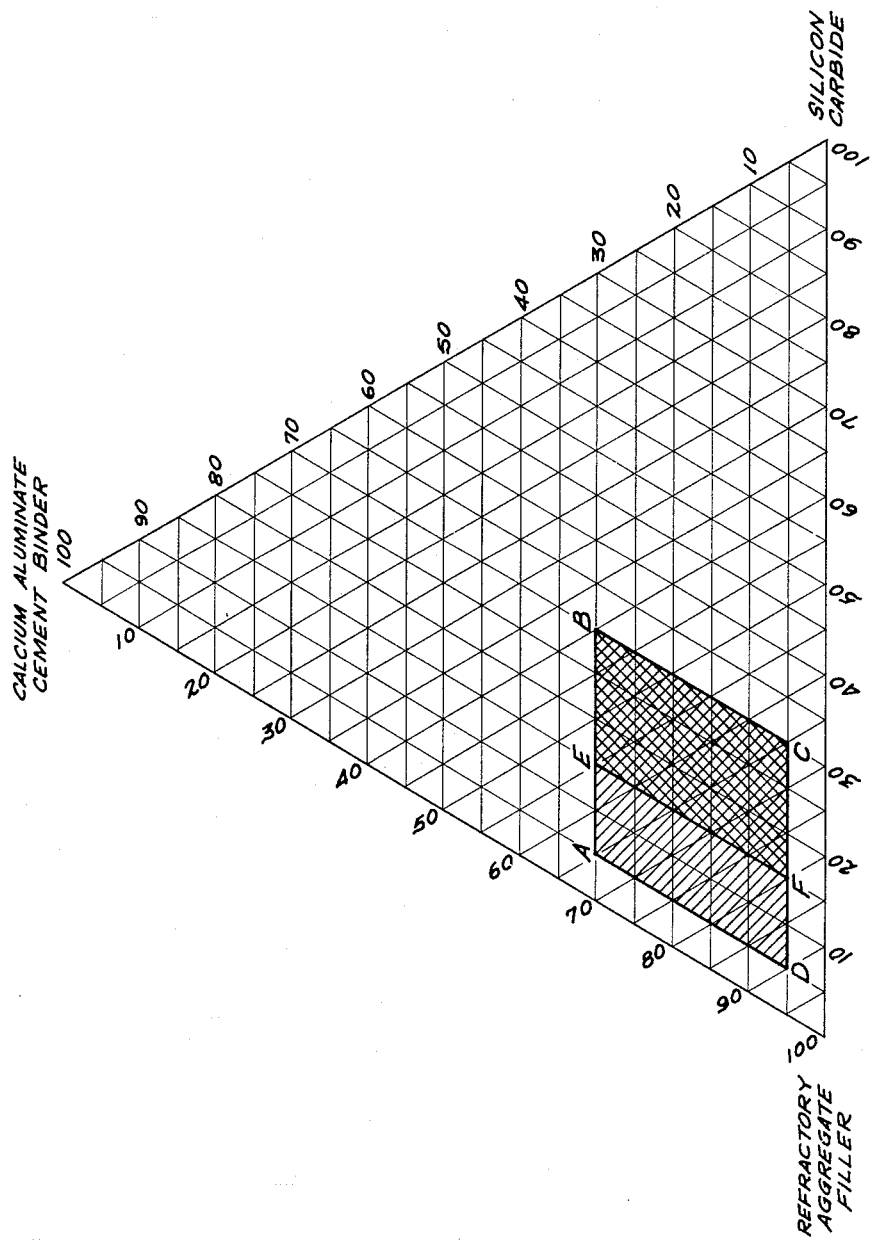
INVENTOR.
ALBERT LAJOS RENKEY

This invention relates to refractory linings. In a particular embodiment, the invention relates to molten-copper and copper alloy-contacting vessel linings such as, for example, the linings of copper induction furnaces. For a discussion of furnaces for melting copper and copper alloys and by way of background see, for example, the book *Copper, The Science and Technology of the Metal, Its Alloys and Compounds*, by Allison Butts, published in 1954 by the Reinhold Publishing Corporation. See, in particular, chapter 10, beginning page 249, entitled "Induction Melting of Copper and Copper Alloys." Induction furnaces are reported to operate with a temperature in the metal bath of about 2100° F.

Experience in the metallurgical industry has shown that it is not always possible to provide a refractory lining which is highly resistant to both the slag and the molten metal present in a given metallurgical process. In some instances, the chemistry of the slag is such that it is extremely corrosive in contact with a refractory; whereas, the same refractory might be quite satisfactory with the molten metal being treated.

In copper and copper alloy-producing vessels and furnaces, the molten metal has a different reactivity relative to certain refractory material than does the matte or slag. And further, the oxidation level of the furnace atmosphere to some extent governs the relative penetrating power of the molten metal.

Depending upon which metallurgical process a refractory is to be used with, it may be fired or unfired, it may be an unconsolidated material formed in place, as a ramming mix or refractory castable, it may be preformed brick, etc. The present invention is particularly concerned with unconsolidated unfired refractories, which are substantially different than their fired counterparts. The refractories of this invention have lower thermal conductivity than their fired counterparts. It has been found that even after they have been placed in service, their desirable characteristics are largely maintained due to the thermal gradient through a vessel or furnace in which they are used.

It long has been recognized by those versed in the art that, assuming other properties were satisfactory, the most effective refractory lining material would be one that resists wetting by both the molten metal and the slag with which it will be in contact in service. Experience has also demonstrated that the inclusion of a reducing agent, in the form of amorphous carbon and/or graphite, to refractory monolithic materials (for example, refractory plastics, castables, ramming mixes, and the like) imparts some definite resistance to penetration and wetting by certain molten metals and slags.

Generally, however, carbonaceous refractories have certain very distinctive disadvantages which severely limit extensive usage. Refractories made of solid carbon and graphite materials are very expensive, and are rapidly consumed in the presence of air or oxygen at high temperature. Also, they are good conductors of heat, thus undesirably permitting expensive furnace heat to be rapidly lost. A still further disadvantage is that since graphite and amorphous carbon have relatively high electrical conductivity, their use has been severely restricted in electrically heated furnaces wherein insulation against current flow is of paramount importance. When carbon powder or graphite is mixed with other refractory materials in an effort to keep down costs while attempting to minimize undesirable effects such as oxidation, much is sacrificed and little is gained.

The United States Patent No. 1,455,748 to Greene is exemplary of prior art mixtures of carbon (or broadly, a carbonaceous material) and magnesia or silica and clay to make a refractory amenable to use for lining induction furnaces. However, while quite satisfactory in many aspects, the Greene mixture tends to be less dense than desired; and, since carbonaceous material in the resulting refractory structure therein disclosed tended to be relatively fluffy and light, it has tended to quite rapidly oxidize and to be eroded by molten metal and slag in service.

The patent to Fisher, United States Patent No. 2,141,600, represented a step forward in the art over the mix of the Greene patent. In essence, Fisher is directed to a magnesia refractory to which is added an amorphous carbon material, graphite, or possibly silicon carbide, a binding agent, and a flux material. The sum purport of the Fisher patent teaching would appear to be the provision of a coating over the carbonaceous inclusion to thereby slow its oxidation loss and susceptibility to corrosion. The bonding or binding and flux materials of Fisher tended to result in a glassy matrix. Of course, a glassy matrix pre-disposes a refractory structure to early vitrification and shrinkage and to slag or melt penetration by providing an inherent continuous network of poor resistance through the refractory structure, thereby tending to reduce its range of application and useful campaign life. Further, graphite-containing mixes have been found typically weak and of low density, making them susceptible to shrinkage cracking in service and erosion by the wash of molten copper.

Accordingly, it is an object of this invention to provide new and improved refractories. It is another object of the invention to provide improved refractories particularly useful for fabricating portions of metallurgical vessel linings for contact with molten copper and copper alloys. And it is another object of the invention to provide improved, unconsolidated, unfired refractories adapted for lining copper induction furnaces.

Yet another object of the invention is to provide refractories for use at high temperatures, which refractories exhibit exceptional resistance to penetration and corrosion by molten copper and copper alloys and slags thereof, resist oxidation by such molten metals and slags, and which have sufficient strength as to resist abrasion and erosion in use.

Briefly, in one embodiment, this invention is directed to a molten copper and copper alloy-contacting vessel lining at least a portion of which is made from a batch consisting of about 15%, by weight, of very finely divided silicon carbide, about 5 to 30%, by weight, of a calcium aluminate cement, and a selected refractory aggregate filler material relatively inert to the other refractory components of the batch. The silicon carbide constitutes a major portion of a substantially continuous matrix cemented in place by a major portion of the calcium aluminate cement about the particulate material which constitutes the filler material.

A better understanding and other objects and advantages of this invention will become readily apparent to those skilled in the metallurgical, ceramic and refractory arts from a study of the following detailed description with reference to illustrative examples and to the drawing.

The drawing is a ternary diagram particularly pointing out the preferred and workable compositions according to this invention.

In an exemplary embodiment, the refractory of this invention is a castable having outstanding success in contact with molten copper, copper alloys and the slags thereof. It has proven its utility in the casings of low frequency induction furnaces and has utility for lining ladles for holding and transporting the molten metal, hearths, and other molten copper and copper alloy-contacting portions of melting and refining furnaces operating on copper, copper-based alloys, bronzes and brasses. This refractory is particularly attractive because of its relatively low cost, ease of manufacture, and facility of installation.

Usable compositions according to this invention are generally found within the area A—B—C—D of the attached ternary diagram. Such compositions are comprised, of about 5 to 30%, by weight, calcium aluminate cement, about 5 to 30% silicon carbide, with the remaining 40 to 90%, by weight, being comprised of selected refractory aggregate filler material relatively inert to the calcium aluminate cement and silicon carbide.

It is particularly important to the invention that the silicon carbide be sufficiently fine and in such quantity as to form a major portion of a substantially continuous and relatively impermeable matrix cemented in place by the calcium aluminate cement about the filler material. To facilitate provision of the most favorable silicon carbide matrix form, it is preferred that the silicon carbide be present in an amount constituting at least about 15%, by weight, based on the total weight of the batch. Thus, preferred mixes fall within the area E—B—C—F of the ternary drawing.

The aggregate filler material can be almost any selected refractory, as long as it is relatively inert to the other components of the batch when subjected to high temperatures. For example, chrome ore, which would tend to react undesirably with constituents of the calcium aluminate cement, which would tend to be reduced by the silicon carbide, should not be used.

The selected aggregate filler constitutes the major portion of and preferably substantially all of, the coarse fraction, i.e. the +28 mesh fraction, of the mix. For example, it typically amounts to about 80 to 100%, by weight, of the +28 mesh fraction, of the mix.

The calcium aluminate cement is instrumental in maintaining the substantially continuous silicon carbide matrix in place about the coarse particles of filler. The calcium aluminate cement is substantially all −65 mesh and, together with the silicon carbide fraction, constitutes substantially the entire −65 mesh fraction of the batch.

While inexpensive, relatively impure, calcium aluminate cements, i.e. ones having upwards of 5% iron oxide, are usable according to this invention, it is preferred that the selected calcium aluminate cement be relatively pure. Examples of preferred calcium aluminate cements are given below.

The silicon carbide of this invention is the single, most important ingredient in the mix. The silicon carbide acts as a penetration and reaction inhibiting ingredient and its role is mainly metallurgical, but, because of its physical state of extremely fine subdivision, it is to a large degree the primary reason for substantial volume stability in refractories according to this invention. Substantially all of the silicon carbide must be finer than 28 mesh, the major portion of the −28 mesh silicon carbide must be finer than 100 mesh, and the major portion of the −100 mesh fraction should be −325 mesh. In essence, the finer the silicon carbide the better. In a preferred embodiment, all of the silicon carbide is −100 mesh, and 70% thereof will be −325 mesh.

Table I below is exemplary of a typical and preferred size grading of particulate matter for making up batch mixes according to this invention.

Table I

| | Percent |
|---|---|
| Pass 3 on 10 mesh | 25 |
| Pass 10 on 28 mesh | 20 |
| Pass 28 on 65 mesh | 10 |
| Pass on 10 on 65 mesh | 30 |
| −65 mesh | 45 |

In Table I, 45% of the total mix is shown as passing a 65 mesh screen. Workable mixes may be made with from 30 to 50% of the total batch mixture passing a 65 mesh screen size.

An exemplary and first usable refractory aggregate filler material according to the invention may be such as for example, about 65 parts calcined flint clay, and about 15 parts quartzite. Another and second workable filler is comprised of about 75 parts superduty fireclay brick bats and about 15 parts of kyanite. Typical analyses of the foregoing materials, by weight, and on the basis of an oxide analysis, are as follows:

Table II

| | SiO$_2$, percent | Al$_2$O$_3$, percent | Other oxides by difference: alkali and alkaline earth oxides, titania, iron oxide, percent |
|---|---|---|---|
| Calcined Flint Clay | 48 | 47 | 5 |
| Quartzite | 99 | 0.0 | 1 |
| Fireclay Brick Bats | 53 | 42 | 5 |
| Kyanite | 41 | 56 | 3 |

In the foregoing analyses, the titania normally amounts to about 50% of that group of minor oxides with which it is reported.

A first and preferred calcium aluminate cement has the following typical analysis, by weight, and on the basis of an oxide analysis: about 72% Al$_2$O$_3$, about 27% CaO and about 1% (by difference) trace impurities.

Various mixes according to the foregoing teachings have been prepared and used, and have met with considerable success in the molten-copper and copper alloy metallurgical industry. An exemplary batch which has met with success is comprised of about 80 parts of the first filler discussed above, about 20 parts of the first calcium aluminate cement discussed above, and about 85 parts of the foregoing mixture of filler and cement mixed with about 15 parts, by weight, of −325 mesh silicon carbide. About 15%, by weight, water is added to the foregoing batch to obtain the desired workability.

Another example of a refractory batch according to this invention which has met with success in the copper and copper alloy metallurgical industries is comprised of about 85 parts of the second filler discussed above, about 15 parts of the second calcium aluminate cement discussed above, and about 85 parts of the foregoing mixture of filler and calcium aluminate cement mixed with about 15 parts of −325 mesh silicon carbide. About 15 parts, by weight, of water is added to obtain the desired workability.

Other refractory materials which may be used for the filler are alumina, bauxitic clays, diasporitic clays, electrically-fused alumina, fused mullite, fused bauxite. Examples of bauxitic clays are South American bauxite and Alabama bauxite. An example of a diasporitic clay is burley diaspore.

The bauxitic and diasporitic clays are preferably calcined clays. Also, small amounts (i.e. up to no more than about 5%, by weight, based on the total weight of the mix) of plasticizers, such as ball clay or koalin, may be used.

In the foregoing discussion, all parts and percentages are by weight. All chemical analyses are on the basis of an oxide analysis in conformity with the common practice in reporting the refractory materials, and in which the various chemical constituents present in a material are reported as though they were present as the simple oxides. For example, any silicon present would be reported as silicon dioxide. All mesh sizes in the foregoing discussion are according to Tyler series.

The present invention is related to that disclosed and claimed in co-pending application Serial No. 177,649, owned by a common assignee. Said application Serial No. 177,649 has been abandoned in favor of copending continuation-in-part application, Serial No. 311,247, filed September 24, 1963, having the same inventors, title, and assignee as said application Serial No. 177,649. Certain teachings disclosed but not claimed therein are claimed herein. The co-pending application is primarily concerned with unfired, unconsolidated refractory materials which include alumina, aluminum ores, fire clay and silicon carbide.

Having thus described the invention in detail and with sufficient particularity as to enable those skilled in the art to practice it, what is desired to have protected by Letters Patent is set forth in the following claims.

I claim:

1. A particulate refractory batch composition consisting essentially of calcium aluminate cement binder, silicon carbide, and selected refractory filler, in substantially the proportions, by weight, falling within the area A—B—C—D of the attached ternary diagram, the silicon carbide substantially all being −28 mesh with a major portion thereof being −100 mesh, the calcium aluminate cement being substantially all −65 mesh, from about 30 to 50% of the total batch passing a 65 mesh screen, the remainder of the batch being −3 +65 mesh, said batch being free of material which will vitrify at temperatures of about 2100° F.

2. The batch of claim 1, in which the silicon carbide constitutes about 15%, by weight, of the batch.

3. The batch of claim 1 in which the refractory filler is selected from that group consisting of flint clay, quartzite, comminuted fireclay brick bats, kyanite, disporitic clays, bauxitic clay, and mixtures thereof.

4. The batch of claim 1 in which the refractory filler is substantially entirely $Al_2O_3$ and $SiO_2$, on the basis of an oxide analysis, and only trace impurities.

5. The batch of claim 1 in which size grading of the total batch is about 25%, by weight, about −3 +10 mesh, about 30% −10 +65 mesh, and about 45% −65 mesh.

6. The batch of claim 1 in which the calcium aluminate cement analyzes at least about 99% $Al_2O_3$ and CaO, by weight, and on the basis of an oxide analysis, with the remainder only trace impurities.

7. The batch of claim 1 in which the refractory filler material is substantially all −3 +28 mesh.

8. A particulate refractory batch composition consisting essentially of calcium aluminate cement binder, silicon carbide, and selected refractory filler in substantially the proportions, by weight, falling within the area E—B—C—F of the attached ternary diagram, and in which the ingredients are so size graded as to be microscopically characterized by relatively coarse particles of refractory filler with a substantially continuous matrix the major constituent of which is silicon carbide cemented in place by said calcium aluminate cement about said filler, from about 30 to 50%, by weight of the batch passing a 65 mesh screen, the remainder of the batch being about −3 +65 mesh, and said batch being free of material which will vitrify at temperatures of about 2100° F.

9. A particulate refractory batch composition consisting essentially of calcium aluminate cement binder, silicon carbide, and selected refractory filler in substantially the proportions, by weight, falling within the area E—B—C—F of the attached ternary diagram, substantially all of said silicon carbide being finer than about 28 mesh, the major portion thereof being finer than 100 mesh and the major portion thereof being −325 mesh, from about 30 to 50% of the total batch of particulate refractory material passing a 65 mesh screen, calcium aluminate cement and silicon carbide constituting substantially all of that fraction passing a 65 mesh screen, and said silicon carbide constituting a major portion of a substantially continuous matrix cemented in place by said calcium aluminate cement about the refractory filler material, the remainder of the batch being about −3 +65 mesh, said batch being free of material which will vitrify at temperatures of about 2100° F.

10. A vessel, a molten-copper-and-copper-alloy-contacting lining in said vessel, said lining made from a particulate refractory batch consisting essentially of calcium aluminate cement binder, silicon carbide, and selected refractory filler, in substantially the proportions, by weight, falling within the area A—B—C—D of the attached ternary diagram, the silicon carbide substantially all being −28 mesh with a major portion thereof being −100 mesh, the calcium aluminate cement being substantially all −65 mesh, from about 30 to 50% of the total batch passing a 65 mesh screen, the remainder of the batch being −3 +65 mesh, said batch being free of material which will vitrify at temperatures of about 2100° F.

References Cited by the Examiner

UNITED STATES PATENTS

| 1,344,461 | 6/20  | Thomas      | 106—64 |
| 2,141,600 | 12/38 | Fisher      | 13—35  |
| 2,246,226 | 6/41  | Walton      | 106—64 |
| 2,388,080 | 10/45 | Riddle      | 106—44 |
| 2,407,135 | 9/46  | Clark       | 106—64 |
| 2,559,343 | 7/51  | Caton       | 106—44 |
| 2,979,414 | 4/61  | Ryshkewitch | 106—44 |
| 3,060,043 | 10/62 | Renkey      | 106—44 |

OTHER REFERENCES

Michaelson: "High-Temperature Ceramic Materials," Product Engineering, August 1951 (pages 120-123).

TOBIAS E. LEVOW, *Primary Examiner.*